United States Patent
Rodak et al.

(10) Patent No.: US 8,603,703 B2
(45) Date of Patent: Dec. 10, 2013

(54) METHOD FOR MAKING SUPER-HYDROPHILIC AND ELECTRICALLY CONDUCTING SURFACES FOR FUEL CELL BIPOLAR PLATES

(75) Inventors: Daniel E. Rodak, Southfield, MI (US); Yang T. Cheng, Troy, MI (US); Mei Cai, Bloomfield Hills, MI (US); Martin S. Ruthkosky, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2340 days.

(21) Appl. No.: 11/459,950

(22) Filed: Jul. 26, 2006

(65) Prior Publication Data

US 2008/0076004 A1    Mar. 27, 2008

(51) Int. Cl.
*H01M 4/64* (2006.01)
*H01M 8/00* (2006.01)

(52) U.S. Cl.
USPC .................................. 429/518; 429/400

(58) Field of Classification Search
None
See application file for complete search history.

(56) References Cited

U.S. PATENT DOCUMENTS

| | | | |
|---|---|---|---|
| 6,309,772 B1 * | 10/2001 | Zuber et al. | 429/483 |
| 6,372,376 B1 | 4/2002 | Fronk et al. | |
| 6,761,927 B1 | 7/2004 | Makkus et al. | |
| 2002/0081478 A1 * | 6/2002 | Busenbender | 429/34 |
| 2002/0146612 A1 * | 10/2002 | Sugiura et al. | 429/32 |
| 2003/0003345 A1 * | 1/2003 | Ohara et al. | 429/38 |
| 2003/0203261 A1 * | 10/2003 | Rapaport et al. | 429/26 |
| 2004/0058205 A1 * | 3/2004 | Mantese et al. | 429/12 |
| 2004/0247978 A1 | 12/2004 | Shimamune | |
| 2005/0277015 A1 * | 12/2005 | Xu et al. | 429/40 |

FOREIGN PATENT DOCUMENTS

| | | |
|---|---|---|
| JP | 11-260383 | 9/1999 |
| JP | 11-273693 | 10/1999 |
| JP | 2000-160360 A | 6/2000 |
| JP | 2001-176519 A | 6/2001 |
| JP | 2002-075399 A | 3/2002 |
| JP | 2003-288915 A | 10/2003 |
| JP | 2007-048753 A | 2/2007 |

OTHER PUBLICATIONS

Vyas, G. et al., U.S. Utility Patent Application entitled "Stable Conductive and Hydrophilic Fuel Cell Contact Element", U.S. Appl. No. 11/172,021, filed Jun. 30, 2005.

* cited by examiner

*Primary Examiner* — Barbara Gilliam
*Assistant Examiner* — Adam A Arciero
(74) *Attorney, Agent, or Firm* — John A. Miller; Miller IP Group, PLC

(57) ABSTRACT

A method for embedding a hydrophilic and electrically conductive layer into a flow field plate or bipolar plate for a fuel cell. In one embodiment, the layer is niobium doped titanium oxide in a powder form. The method includes mixing the powder material in a suitable solution, such as a solvent. The solution is deposited on a substrate, such as a stainless steel substrate, by any suitable process, such as brushing. The substrate is then heated so that the solvent evaporates to leave a coating of the powder material. The substrate is then positioned in a die press and is stamped to the shape of the bipolar plate, where the stamping operation embeds the powder material into an outer surface of the bipolar plate.

19 Claims, 2 Drawing Sheets

METHOD FOR MAKING SUPER-HYDROPHILIC AND ELECTRICALLY CONDUCTING SURFACES FOR FUEL CELL BIPOLAR PLATES

BACKGROUND OF THE INVENTION

1. Field of the Invention

This invention relates generally to a method for embedding a hydrophilic and electrically conductive layer into a bipolar plate for a fuel cell and, more particularly, to a method for embedding a niobium doped titanium oxide powder into an outer surface of a bipolar plate for a fuel cell to make the plate electrically conducted and hydrophilic.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are popular fuel cells for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. The automotive fuel cell stack mentioned above may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate less hydrophilic.

As is well understood in the art, the membrane within a fuel cell needs to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water may accumulate within the flow channels because the flow rate of the reactant gas is too low to force the water out of the channels. As the water accumulates, it forms droplets that continue to expand because of the relatively hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

The various surface layers proposed in the art to make the bipolar plate hydrophilic also need to have a low contact resistance so that the plate is sufficiently electrically conductive. U.S. patent application Ser. No. 11/172,021, filed Jun. 30, 2005, titled Stable Conductive and Hydrophilic Fuel Cell Contact Element, assigned to the Assignee of this application and herein incorporated by reference, discloses various hydrophilic and electrically conductive layers. Specific materials include niobium (Nb) and tantalum (Ta) doped titanium oxide ($TiO_2$), tantalum doped (T) $TiO_2$ and fluorine (F) doped tin oxide ($SnO_2$).

SUMMARY OF THE INVENTION

In accordance with the teachings of the present invention, a method for embedding a hydrophilic and electrically conductive layer into a flow field plate or bipolar plate for a fuel cell is disclosed. In one embodiment, the layer is niobium doped titanium oxide in a powder form. The method includes mixing the powder material in a suitable solution, such as a solvent. The solution is deposited on a substrate, such as a stainless steel substrate, by any suitable process, such as brushing. The substrate is then heated so that the solvent evaporates to leave a coating of the powder material. The substrate is then positioned in a die press and is stamped to the shape of the bipolar plate, where the stamping operation embeds the powder material into an outer surface of the bipolar plate.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for pressing a porous niobium doped titanium oxide powder into a bipolar plate for a fuel cell is merely exemplary in nature, and is in no way intended to limit the invention or its applications or uses.

Figure 1:
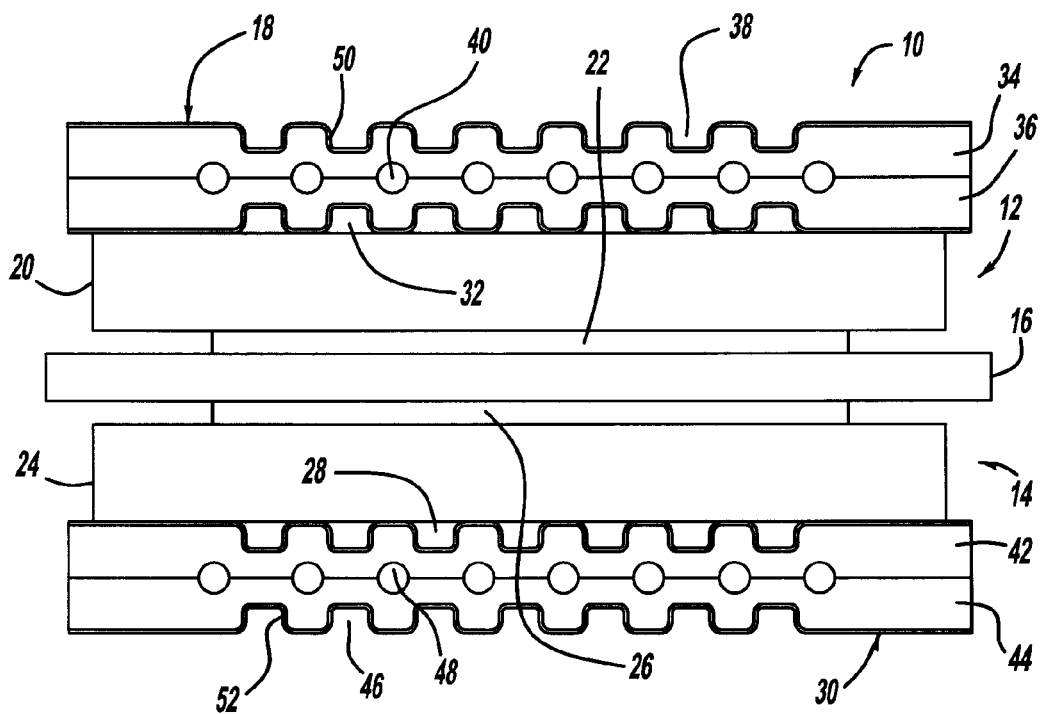
FIG. 1 is a cross-sectional view of a fuel cell in a fuel cell stack that includes bipolar plates having a niobium doped titanium oxide layer that makes the plate electrically conductive and hydrophilic in a fuel cell environment.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The end product is water, which does not have any negative impact on the environment.

In this non-limiting embodiment, the bipolar plate 18 includes two sheets 34 and 36 that are stamped and formed together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. The bipolar plates 18 and 30 can be made of any suitable material that can be stamped, such as stainless steel, titanium, aluminum, etc.

According to one embodiment of the present invention, the bipolar plates 18 and 30 include a thin layer 50 and 52, respectively, of a material that makes the plates 18 and 30 electrically conductive, corrosion resistant, hydrophilic and stable in the fuel cell environment. In one embodiment, the layers 50 and 52 are rutile phase niobium doped titanium oxide pressed into an outer surface of the bipolar plates as a powder. However, in other embodiments, the layers 50 and 52 may be other suitable materials, such as tantalum doped titanium oxide and fluorine doped tin oxide. In other embodiments, other oxides may also be applicable such as tin oxide and tungsten oxide. Further, other dopants may also be applicable, such as lanthanum, manganese, molybdenum, tungsten, vanadium, miobium, tantalum, strontium and yttrium.

The layers 50 and 52 provide improved water management of the fuel cell 10, improved internal electrical conductivity of the fuel cell 10, enhanced low power stability of the fuel cell 10, improved performance of the fuel cell 10, improved durability of the fuel cell 10, improved degradation of the bipolar plates 18 and 30, and protects MEA materials from contamination. Further, because the layers 50 and 52 are porous, the porosity also increases the hydrophilicity of the layers 50 and 52.

The hydrophilicity of the layers 50 and 52 causes the water within the flow channels 28 and 32 to form a film instead of water droplets so that the water does not significantly block the flow channels. Particularly, the hydrophilicity of the layers 50 and 52 decreases the contact angle of water accumulating in the flow channels 32, 38, 28 and 46, preferably below 20°, so that the reactant gases delivers the flow through the channels at low loads.

Further, by making the bipolar plates 18 and 30 more conductive, the electrical contact resistance between the fuel cells and the losses in the fuel cell are reduced, thus increasing cell efficiency. Also, an increase in the conductivity of the layers 50 and 52 provides a reduction in compression force in the stack, addressing certain durability issues within the stack.

Also, the layers 50 and 52 are stable, i.e., corrosion resistant. Particularly, the hydrofluoric acid generated as a result of degradation of the perfluorosulfonic ionomer in the membrane 16 during operation of the fuel cell 10 does not corrode the layers 50 and 52.

In one embodiment, the rutile phase niobium doped titanium oxide for the layers 50 and 52 was made as follows. Nano-sized titanium oxide particles were suspended in absolute ethanol and a predetermined amount of niobium precursor was added. The mixture was sonicated for a suitable period of time and dried. The resulting dry powder was ground into a fine powder, and then reduced in a pure hydrogen environment at a temperature of 1050° C. for a suitable period of time.

Figure 2:
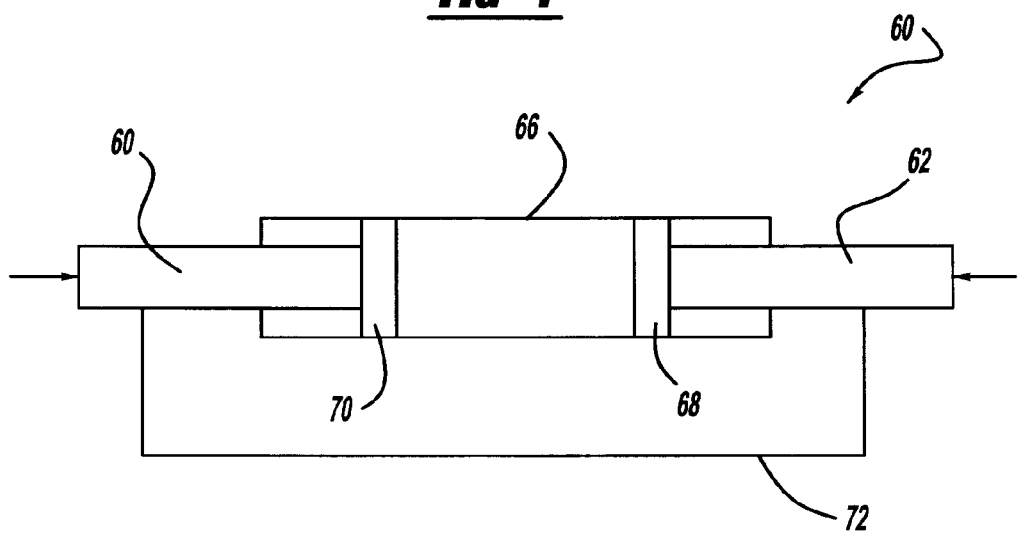
FIG. 2 is a device used to measure the electrical resistivity of a niobium doped titanium oxide pressed powder.

The electrical resistivity of the niobium doped titanium oxide disk 66 was then measured using an AC resistance bridge. FIG. 2 illustrates a device 60 that was used for the electrical measurement. The device 60 includes opposing probes 62 and 64 that hold a titanium oxide powder between seals 68 and 70. The device 60 uses the four-point probe method to measure the electrical conductivity of powders with a controlled porosity. A clamping force of 5000 psi was applied to the powder 66, and an electrical current was passed through the probes 62 and 64 and the powder 66 on line 72. The resistance of the powder 66 was calculated through the voltage drop between the probes 62 and 64. The measured electrical resistivity was $5 \times 10^4$ ohm-cm for commercial titanium oxide powder and 15 ohm-cm for 5-10% niobium doped titanium oxide powder.

XRD analysis showed only rutile phase titanium oxide in the disk 66. Electron probe microanalysis showed a single-phase uniform distribution of niobium in the powder 66 and a uniform incorporation of niobium within the titanium oxide crystal lattices. As the niobium concentration in the powder gradually increases, diffraction peak shifts indicate the expansion of the crystal unit cell due to the niobium.

Water contact angle measurements were made using a Kruss DSA10L Drop Shape Analysis system operated at 23° C. and 60% RH. The droplet fluid used in these tests was double distilled 18 MΩ deionized water. The entire droplet was absorbed into the powder 66 in less than half a second. As water is added to the surface of the powder 66, it continues to be absorbed into the powder 66 until a maximum is reached. Beyond this point water added to the powder 66 sits on top of the powder 66 with a contact angle of about 5°. This low contact angle is a result of a composite surface consisting of both the niobium doped titanium oxide particles and water.

Figure 3A:
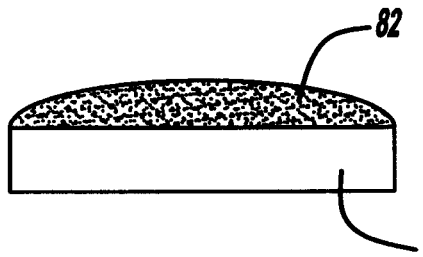
FIGS. 3a-3e show process steps for pressing a niobium doped titanium oxide powder into a stamped bipolar plate substrate, according to an embodiment of the present invention.
Figure 3B:
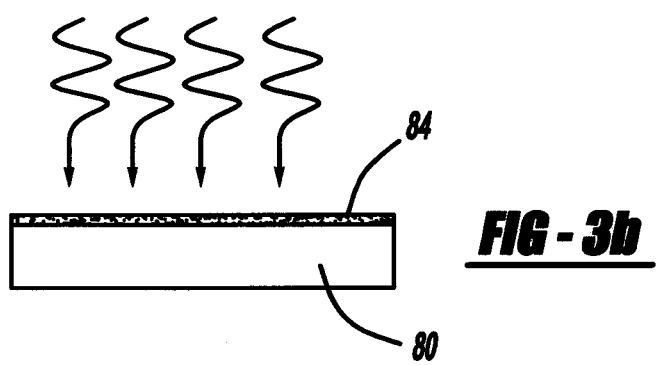
Figure 3C:
Figure 3D:
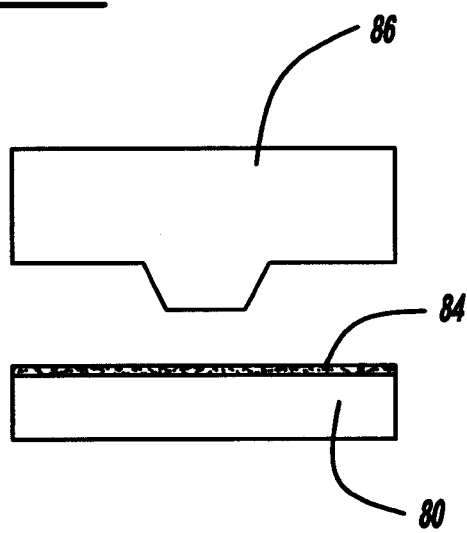
Figure 3E:
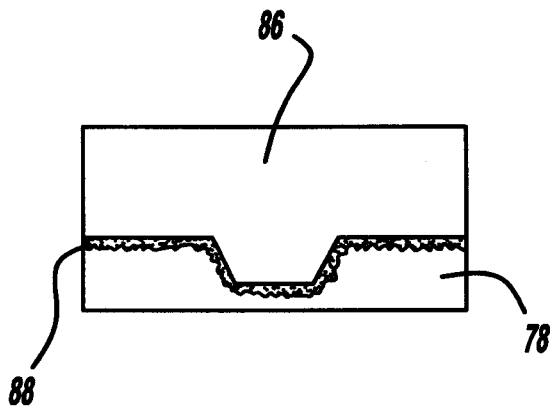
Figure 3E:
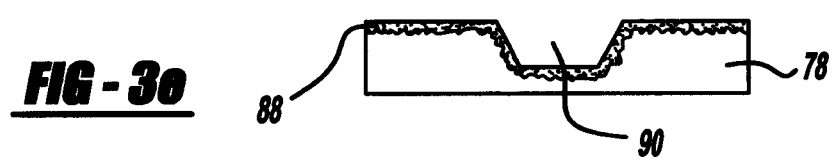

FIGS. 3a-3e show a series of process steps for pressing a niobium doped titanium oxide powder into a substrate 80 that will be stamped into a bipolar plate 78, according to an embodiment of the present invention. Before the titanium oxide powder is deposited on the substrate 80, the substrate 80 is cleaned by a suitable process, such as degreasing chemical etching, ion beam sputtering, etc., to remove the resistive oxide film that may have formed on the outside surface of the substrate 80. A solution of the niobium doped titanium oxide was prepared, as discussed above, in a suitable solvent, such as ethanol. In FIG. 3a, the substrate 80 is covered with a layer 82 of niobium doped titanium oxide suspended in the solution. The layer 82 can be deposited on the substrate 80 by any suitable process, such as by a sol gel process, by dipping or by brushing. The substrate 80 is then heated so that the solvent evaporates to leave a layer 84 of niobium doped titanium oxide powder, as shown in FIG. 3b. The substrate 80 is then stamped with a suitable die 86 to form the bipolar plate 78 and press the niobium doped titanium oxide powder into the top surface of the plate 78, as shown in FIGS. 3c and 3d. The resulting bipolar plate 88 including an embedded layer 90 of the niobium doped titanium oxide powder. A flow channel 92 is shown in the plate 88.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for forming a hydrophilic and electrically conductive layer to a bipolar plate, said method comprising:
   providing a composition of a hydrophilic and electrically conductive material that will be formed into the layer;
   mixing the hydrophilic and electrically conductive material in a solution;
   depositing the solution on a surface of a substrate;
   heating the substrate to evaporate the solution and leave a coating of the hydrophilic and electrically conductive material on the substrate;
   positioning the coated substrate in a stamping press; and
   stamping the substrate to shape the substrate into the bipolar plate and embed the material into a surface of the bipolar plate to form the layer.

2. The method according to claim 1 wherein providing a composition of the hydrophilic and electrically conductive material includes providing a titanium oxide powder.

3. The method according to claim 2 wherein providing a composition of the hydrophilic and electrically conductive material includes mixing a niobium dopant material with the titanium oxide powder.

4. The method according to claim 3 wherein mixing the hydrophilic and electrically conductive material in the solution includes mixing the titanium oxide and niobium in a solution of alcohol.

5. The method according to claim 4 wherein heating the substrate includes evaporating the alcohol leaving a layer of niobium doped titanium oxide on the substrate.

6. The method according to claim 1 wherein providing a composition of the hydrophilic and electrically conductive material includes providing a composition of a tantalum doped titanium oxide, and wherein mixing the hydrophilic and electrically conductive material in a solution includes mixing the tantalum doped titanium oxide in an alcohol solution.

7. The method according to claim 1 wherein providing a composition of the hydrophilic and electrically conductive material includes providing a composition of fluorine doped tin oxide, and wherein mixing the hydrophilic and electrically conductive material in a solution includes mixing the fluorine doped tin oxide in an alcohol solution.

8. The method according to claim 1 wherein providing a composition of the hydrophilic and electrically conductive material includes providing a composition of materials selected from the group consisting of tin oxide and tungsten oxide.

9. The method according to claim 1 wherein providing a composition of the hydrophilic and electrically conductive material includes mixing a dopant selected from the group consisting of lanthanum, manganese, molybdenum, tungsten, vanadium, miobium, tantalum, strontium and yttrium with an oxide.

10. The method according to claim 1 wherein depositing the solution on the surface includes brushing the solution onto the surface.

11. The method according to claim 1 wherein providing a substrate includes providing a stainless steel substrate.

12. The method according to claim 1 wherein the bipolar plate is part of a fuel cell stack on a vehicle.

13. A method for embedding a niobium doped titanium oxide powder into a surface of a stainless steel bipolar plate for a fuel cell, said method comprising:

providing a sample of titanium oxide powder;

mixing niobium in the titanium oxide powder to form a powder of niobium doped titanium oxide;

mixing the niobium doped titanium oxide powder in an alcohol solution;

depositing the solution on a surface of a substrate;

heating the substrate to evaporate the alcohol and leave a coating of the niobium doped titanium oxide powder on the substrate;

positioning the coated substrate in a stamping press; and stamping the substrate to shape the substrate into the bipolar plate and embed the niobium doped titanium oxide into the surface of the bipolar plate.

14. The method according to claim 13 wherein depositing the solution on the surface includes brushing the solution onto the surface.

15. The method according to claim 13 wherein the bipolar plate is part of a fuel cell stack on a vehicle.

16. A fuel cell comprising a flow field plate being made of a plate material, said flow field plate including a plurality of reactant gas flow channels responsive to a reactant gas, said flow field plate further including a layer of niobium doped titanium oxide powder embedded into a surface of the plate that makes the plate electrically conductive, hydrophilic and stable in a fuel cell environment.

17. The fuel cell according to claim 16 wherein the plate material is stainless steel.

18. The fuel cell according to claim 16 wherein the flow field plate is selected from the group consisting of anode side flow field plates and cathode side flow field plates.

19. The fuel cell according to claim 16 wherein the fuel cell is part of a fuel cell stack on a vehicle.

* * * * *